United States Patent
Dumoit et al.

(10) Patent No.: US 9,822,626 B2
(45) Date of Patent: Nov. 21, 2017

(54) PLANNING AND PERFORMING RE-FRACTURING OPERATIONS BASED ON MICROSEISMIC MONITORING

(71) Applicants: Jeremy Dumoit, Richmond, TX (US); David Katz, Spring, TX (US); Robert Hurt, Tomball, TX (US)

(72) Inventors: Jeremy Dumoit, Richmond, TX (US); David Katz, Spring, TX (US); Robert Hurt, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 324 days.

(21) Appl. No.: 14/615,033

(22) Filed: Feb. 5, 2015

(65) Prior Publication Data
US 2016/0230524 A1 Aug. 11, 2016

(51) Int. Cl.
*E21B 43/26* (2006.01)
*G01V 1/40* (2006.01)
*E21B 43/267* (2006.01)
*G01V 1/28* (2006.01)
*G01V 1/30* (2006.01)
*G01V 1/42* (2006.01)
*G01V 1/50* (2006.01)

(52) U.S. Cl.
CPC ............ *E21B 43/267* (2013.01); *G01V 1/288* (2013.01); *G01V 1/30* (2013.01); *G01V 1/42* (2013.01); *G01V 1/50* (2013.01); *G01V 2210/1234* (2013.01); *G01V 2210/1425* (2013.01); *G01V 2210/1429* (2013.01); *G01V 2210/646* (2013.01)

(58) Field of Classification Search
CPC .......... E21B 43/26; E21B 43/267; G01V 1/40
See application file for complete search history.

(56) References Cited

U.S. PATENT DOCUMENTS

| | | | | |
|---|---|---|---|---|
| 7,946,340 | B2* | 5/2011 | Surjaatmadja | E21B 43/26 166/250.1 |
| 8,938,363 | B2* | 1/2015 | Beasley | E21B 43/26 166/308.1 |
| 9,140,109 | B2* | 9/2015 | Suarez-Rivera | E21B 43/26 |

(Continued)

OTHER PUBLICATIONS

Dohmen, et al., "A New Surveillance Method for Delineation of Depletion Using Microseismic and Its Application to Development of Unconventional Reservoirs"; SPE 166274, Annual Technical Conference/Exhibition, New Orleans, LA, Sep. 30-Oct. 2, 2013, 14 pgs.

*Primary Examiner* — Kenneth L Thompson
(74) *Attorney, Agent, or Firm* — Cantor Colburn LLP

(57) ABSTRACT

An embodiment of a method of stimulating an earth formation includes: disposing a stimulation device at a borehole in an earth formation, the earth formation having been stimulated by an initial stimulation operation; subsequent to the stimulation operation, performing a probe operation configured to cause movement of existing fractures in the formation; and measuring microseismic events occurring in the formation by one or more seismic receivers. The method further includes: identifying one or more target zones in the formation based on the measuring, the one or more target zones exhibiting a reduced micro seismicity relative to another zone in the formation; and designing a re-stimulation operation configured to stimulate the one or more target zones to increase hydrocarbon production from the formation.

16 Claims, 4 Drawing Sheets

(56) References Cited

U.S. PATENT DOCUMENTS

| | | | | |
|---|---|---|---|---|
| 9,176,245 B2* | 11/2015 | Craig | ............... | E21B 43/26 |
| 9,529,104 B2* | 12/2016 | Ma | ............... | E21B 43/26 |
| 2010/0252268 A1* | 10/2010 | Gu | ............... | E21B 43/26 |
| | | | | 166/308.1 |
| 2013/0075086 A1* | 3/2013 | Press | ............... | E21B 43/003 |
| | | | | 166/249 |
| 2013/0140031 A1* | 6/2013 | Cohen | ............... | E21B 43/26 |
| | | | | 166/308.1 |
| 2015/0129211 A1* | 5/2015 | Dusseault | ............ | E21B 43/267 |
| | | | | 166/280.1 |
| 2015/0212224 A1* | 7/2015 | Williams | ............. | G01V 1/288 |
| | | | | 702/14 |
| 2016/0123117 A1* | 5/2016 | Gu | ............... | E21B 47/065 |
| | | | | 166/305.1 |

* cited by examiner

PLANNING AND PERFORMING RE-FRACTURING OPERATIONS BASED ON MICROSEISMIC MONITORING

BACKGROUND

Hydrocarbon exploration and energy industries employ various systems and operations to accomplish activities including drilling, formation evaluation, stimulation and production. Hydrocarbon production can be improved, especially in more challenging types of formations (e.g., shale formations, tight reservoirs), by using stimulation techniques. One such technique is hydraulic fracturing, in which stimulation fluid is pumped into a formation to generate or open fractures and release stored hydrocarbons. In some cases, multiple fracturing operations, including an initial fracturing operation and one or more re-fracturing operations, are performed in an attempt to enhance production volumes.

SUMMARY

An embodiment of a method of stimulating an earth formation includes: disposing a stimulation device at a borehole in an earth formation, the earth formation having been stimulated by an initial stimulation operation; subsequent to the stimulation operation, performing a probe operation configured to cause movement of existing fractures in the formation; and measuring microseismic events occurring in the formation by one or more seismic receivers. The method further includes: identifying one or more target zones in the formation based on the measuring, the one or more target zones exhibiting a reduced microseismicity relative to another zone in the formation; and designing a re-stimulation operation configured to stimulate the one or more target zones to increase hydrocarbon production from the formation.

A system for stimulating an earth formation includes: a stimulation device configured to be disposed at a borehole in an earth formation, the earth formation having been stimulated by an initial stimulation operation; a microseismic monitoring system including one or more seismic receivers; and a processor. The processor is configured to perform: subsequent to the stimulation operation, performing a probe operation via the stimulation device to cause movement of existing fractures in the formation; measuring microseismic events occurring in the formation by the one or more seismic receivers; identifying one or more target zones in the formation based on the measuring, the one or more target zones exhibiting a reduced microseismicity relative to another zone in the formation; and designing a re-stimulation operation configured to stimulate the one or more target zones to increase hydrocarbon production from the formation.

BRIEF DESCRIPTION OF THE DRAWINGS

The following descriptions should not be considered limiting in any way. With reference to the accompanying drawings, like elements are numbered alike.

DETAILED DESCRIPTION

The systems and methods described herein provide for planning, optimizing and/or performing stimulation operations including re-fracturing operations. Embodiments of methods described herein include using microseismic monitoring after a stimulation (e.g., fracturing) operation to identify regions of a formation around a well that have the potential for further production. In one embodiment, microseismic measurements are taken to identify depletion zones around a produced well, which correspond to zones from which hydrocarbons have been substantially produced. By contrasting the depletion zones with other regions in the formation, a re-stimulation (e.g., re-fracturing) operation may be planned to target those other regions for production. The methods provide techniques for improving production from formations and optimizing or improving hydrocarbon recovery by re-fracturing. In one embodiment, the microseismic measurements are performed in conjunction with a probe operation that includes injecting fluid downhole in order to cause slippage or other movement of existing fractures including the fractures created by an initial fracturing operation.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

Figure 1:
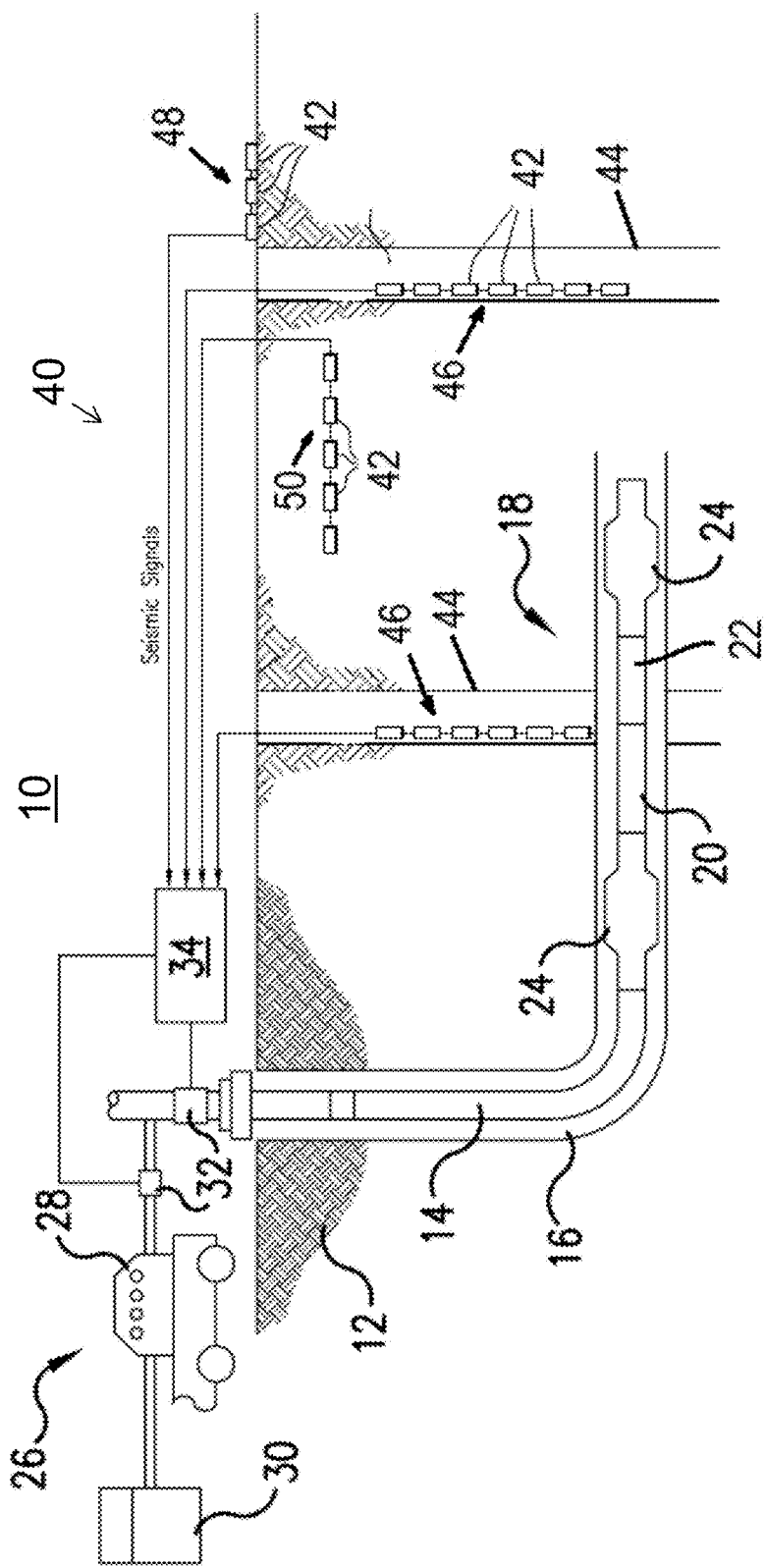
FIG. 1 depicts an embodiment of a hydrocarbon production and/or stimulation system.

Referring to FIG. 1, an exemplary embodiment of a hydrocarbon production and/or stimulation system 10 configured to produce and/or stimulate production of hydrocarbons from an earth formation 12. A borehole string 14 is configured to be disposed in a borehole 16 that penetrates the formation 12. The borehole 16 may be an open hole, a cased hole or a partially cased hole. In one embodiment, the borehole string 14 is a stimulation or injection string that includes a tubular, such as a coiled tubing, pipe (e.g., multiple pipe segments) or wired pipe, that extends from a wellhead at a surface location (e.g., at a drill site or offshore stimulation vessel). As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHAs and drill strings.

In one embodiment, the system 10 is configured as a hydraulic stimulation system. As described herein, "hydraulic stimulation" includes any injection of a fluid into a formation. A fluid may be any flowable substance such as a liquid or a gas, and/or a flowable solid such as sand. In this embodiment, the string 14 includes a stimulation assembly 18 that includes one or more tools or components to facilitate stimulation of the formation 12. For example, the string 14 includes a fracturing assembly 20, such as a fracture or "frac" sleeve device, and/or a perforation assembly 22. Examples of the perforation assembly 22 include shaped charges, torches, projectiles and other devices for perforating the borehole wall and/or casing. The string 14 may also include additional components, such as one or more isolation or packer subs 24.

One or more of the stimulation assembly 18, the fracturing assembly 20, the perforation assembly 22 and/or packer subs 24 may include suitable electronics or processors configured to communicate with a surface processing unit and/or control the respective tool or assembly.

The system 10 includes various equipment for injection of fluids into the borehole 16 in order to, e.g., stimulate the formation 12 to create new fractures (referred to as a fracturing operation) and/or re-stimulate an area of the formation that was previously fractured. An exemplary re-stimulation is referred to as a re-fracturing operation. A re-fracturing operation is performed by injecting fluids into a previously fractured formation or interval to create new fractures and/or to re-open or extend existing fractures.

In one embodiment, an injection system 26 is employed to stimulate or re-stimulate the formation 12. The injection system 26 includes an injection device such as a high pressure pump 28 in fluid communication with a fluid tank 30, mixing unit or other fluid source or combination of fluid sources. The pump 28 injects fluid into the string 14 or the borehole 16 to introduce fluid into the formation 12, for example, to stimulate and/or fracture the formation 12. The pump 28 may be located downhole or at a surface location.

One or more flow rate and/or pressure sensors 32 are disposed in fluid communication with the pump 28 and the string 14 for measurement of fluid characteristics. The sensors 32 may be positioned at any suitable location, such as proximate to (e.g., at the discharge output) or within the pump 28, at or near the wellhead, or at any other location along the string 14 or the borehole 16. The sensors described herein are exemplary, as various types of sensors may be used to measure various parameters.

A processing and/or control unit 34 is disposed in operable communication with the sensors 32 and the pump 28. The processing and/or control unit is configured to receive, store and/or transmit data generated from the sensors 32 and/or the pump 28, and includes processing components configured to analyze data from the pump 28 and the sensors, provide alerts to the pump 28 or other control unit and/or control operational parameters. The processing and/or control unit 34 includes any number of suitable components, such as processors, memory, communication devices and power sources.

In one embodiment, a seismic monitoring system 40 is included as part of the system 10 and/or employable in conjunction with the system 10. The monitoring system 40 includes one or more seismic transducers or receivers 42 configured to receive seismic signals and convert them to electrical or optical signals for transmission and/or recording. In the art, seismic receivers may also be referred to as geophones. The seismic receivers 42 may be placed in any suitable location or configuration relative to the formation to be stimulated or re-stimulated. For example, one or more monitoring wells 44 are drilled near the producing borehole 16 and include a downhole receiver array 46. Other exemplary configurations include one or more surface receiver arrays 48 and one or more shallow arrays 50 buried in the earth. The seismic receivers 42 are coupled to a data logger or other processor that is configured to record a signal magnitude as a function of time for each of the seismic receivers. Functions of the data logger may be performed by a processor or processing unit such as the control unit 34

The monitoring system 40 and the receivers 42 are configured, in one embodiment, as a microseismic monitoring system. Microseismic monitoring concerns passively monitoring a formation for seismic events which are typically very small. In passive monitoring, the formation is not interrogated, per se, but the seismic receivers 42 are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. Monitoring seismic waves generated during a fracturing operation provides information about the operation, such as the direction and extent of the fractures being generated. The location, magnitude and moment (i.e., mechanical character) of a microseismic event are encoded in the characteristics of the radiated seismic waves.

Various sensing or measurement devices may be included in the system 10, in downhole and/or surface locations. For example, one or more parameter sensors (or sensor assemblies such as LWD subs) are configured for formation evaluation measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), and sensors for measuring borehole fluid parameters (e.g., viscosity, density, clarity, rheology, pH level, and gas, oil and water contents).

Figure 2:
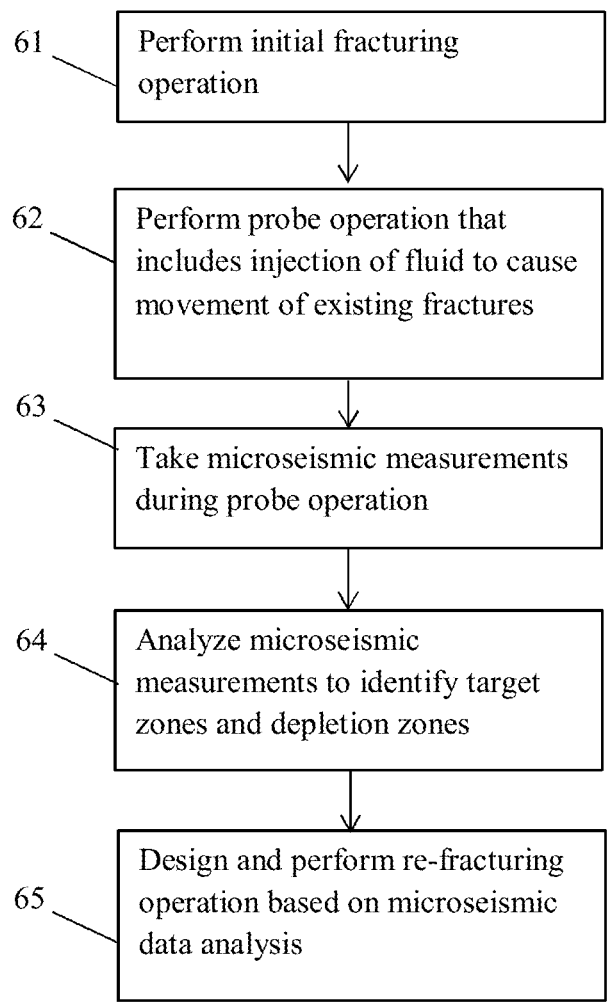
FIG. 2 is a flow chart providing an exemplary method of stimulating and producing hydrocarbons from an earth formation.

FIG. 2 illustrates a method 60 for stimulating and/or producing hydrocarbons from an earth formation. The method 60 includes performing a stimulation operation such as a fracturing operation, evaluating the operation and designing a re-stimulation operation based on the evaluation. The method may be performed by one or more processors or processing units (e.g., the control unit 34) that are configured to receive information and plan, control and/or monitor fracturing operations. The method 60 includes one or more of stages 61-65 described herein. In one embodiment, the method 60 includes the execution of all of stages 61-65 in the order described. However, certain stages 61-65 may be omitted, stages may be added, or the order of the stages changed.

In one embodiment, the method 60 is performed as specified by an algorithm that allows a processor (e.g., the control unit 34) to plan an operation, control operational parameters, and collect and analyze monitoring or measurement data, among other functions. The processor as described herein may be a single processor or multiple processors (e.g., a network). For example, the control unit 34 may perform all of the functions including controlling a fracturing operation, collecting and analyzing microseismic data, designing a re-fracturing operation and performing the re-fracturing operation. Alternatively, some or all of these function may be performed individually by separate processors or processing units in communication with one another, a user or a master controller.

In the first stage 61, an initial fracturing operation is performed to stimulate production from a formation, and formation fluids resulting from this fracturing operation are produced. For example, a new unproduced borehole, such as a in infill well drilled in a hydrocarbon field, is stimulated by injecting fracturing fluid using, e.g., the system 10, and stimulating the opening of natural fractures and the creation of new fractures in the formation. Fluids from the formation are produced and collected.

In some instances, stimulation of the formation is uneven, resulting in uneven production along the length of the borehole. This can result in incomplete stimulation and suboptimal production. As fluid is pumped into the borehole, differences in pressure and/or formation properties along the borehole can cause fluid to be disproportionately flow into some regions around the borehole, resulting in regions (or zones) that are highly fractured and release a relatively large volume of hydrocarbons, and regions that were less effectively fractured.

In the second stage 62, after production resulting from the initial fracturing operation is complete, a probe operation is performed to cause existing fractures to move or slip, thereby causing microseismic events. A fluid (referred to as a treatment fluid) is injected into the borehole at a pressure sufficient to force fluid into the formation and cause existing fractures to move without introducing or creating new fractures. The purpose of the probe operation is not to create new fractures, but rather to cause existing fractures to generate seismic waves, which are measured as microseismic events.

The treatment fluid may be any suitable type of fluid, liquid or mixture. An exemplary fluid is water or brine, although any suitable fluid mixture may be used. In one embodiment, the fluid does not include any proppant (e.g., sand) or other material that would cause a fracture to stay open, as the fluid is configured to allow the fractures to return to a previous state after slipping so as to generate a significant seismic signal.

The treatment fluid is injected so that the downhole pressure of the fluid is sufficient to force the fluid into fractures and allow them to move. For example, the formation is pressurized and then allowed to relax, causing slippage or re-activation of existing fractures. The borehole is pressurized to a pressure that is below the fracture pressure of the formation, which is defined as the pressure above which fluids cause the formation to hydraulically fracture, i.e., cause new fractures to form. The fracture pressure may be determined based on previously measured formation properties, or based on pressure measurements performed during the initial fracturing operation. An exemplary pressure that could be exerted is a "leakoff" pressure, which is a pressure level typically applied in conjunction with other diagnostic tests such as pressure integrity tests (PIT) or leakoff tests (LOT).

In contrast to a traditional hydraulic fracturing stage, the purpose of the probe stage is not to induce new fracturing. During this stage, it is desirable to pressurize the formation along the entire length of the borehole (or along some selected interval of interest) as evenly as possible. In some instances, pressurizing the borehole to a leakoff pressure or other suitable pressure may be sufficient to stimulate movement or slippage of all existing fractures in the formation around the borehole. In other instances, in order to ensure that fluid is stimulating all or most existing fractures (instead of all the fluid taking a single path or few paths of least resistance), multiple lengths of the borehole may be targeted sequentially using appropriate devices such as dissolvable plugs and/or diverters.

In the third stage 63, during the probe operation, microseismic measurements are performed using seismic receivers positioned in or near the formation. Exemplary receivers include geophones positioned in various arrays, such as the arrays 46, 48 and/or 50 of FIG. 1. Microseismic events are recorded and the location of each measured microseismic event is associated with a location in the formation, e.g., by performing an inversion technique. The events and their locations are referred to as microseismic data.

During this stage, the formation is monitored during the injection period of the probe operation, and may also be monitored for a selected period of time after injection is completed. For example, the formation is monitored for at least several hours after pumping of fluid is completed.

In the fourth stage 64, the microseismic data is analyzed to identify zones in the formation that could be further stimulated and produced. The microseismic data is analyzed to estimate the number of events and their concentration in areas or zones of the formation around the borehole. Zones or areas of the formation that have high depletion, i.e., a significant amount of fluid has been produced from that zone, are referred to as depletion zones.

Depletion zones are areas of high microseismicity generated by activation (e.g., opening, slipping) of existing fractures. High microseismicity corresponds with highly fractured zones from which hydrocarbons were produced. Areas of low microseismicity, identified by a relatively few number of microseismic events measured as a result of the probe operation, correspond to regions of low-depletion and high remaining hydrocarbon content of the reservoir. These regions of low microseismicity (also referred to as target zones) were not optimally stimulated in the original stimulation of the formation, and may be targeted during re-fracturing to improve or optimize production from the formation.

In one embodiment, a map of the formation is generated that indicates locations and/or magnitudes of microseismic events that occurred as a result of the probe operation. The number of microseismic events generated in a zone is indicative of the number, extent and/or concentration of fractures in the zone. Depletion zones are identified as those areas having a relatively few number of microseismic events. In addition, target zones are identified that include a high number and/or concentration of events, which indicates a highly fractured zone that has already produced a significant amount of fluid.

Figure 3:
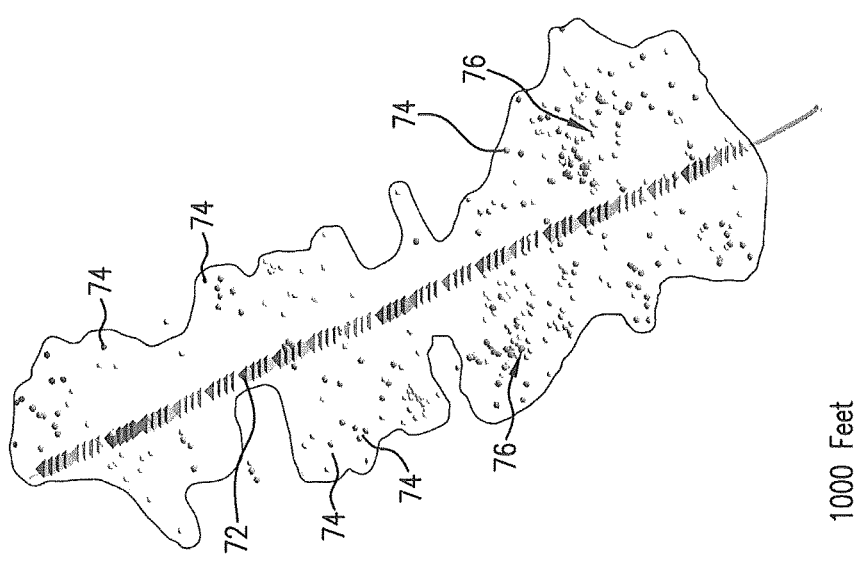
FIG. 3 depicts exemplary microseismic data resulting from microseismic monitoring of a formation after stimulation of the formation, according to the method of FIG. 2.
Figure 4:
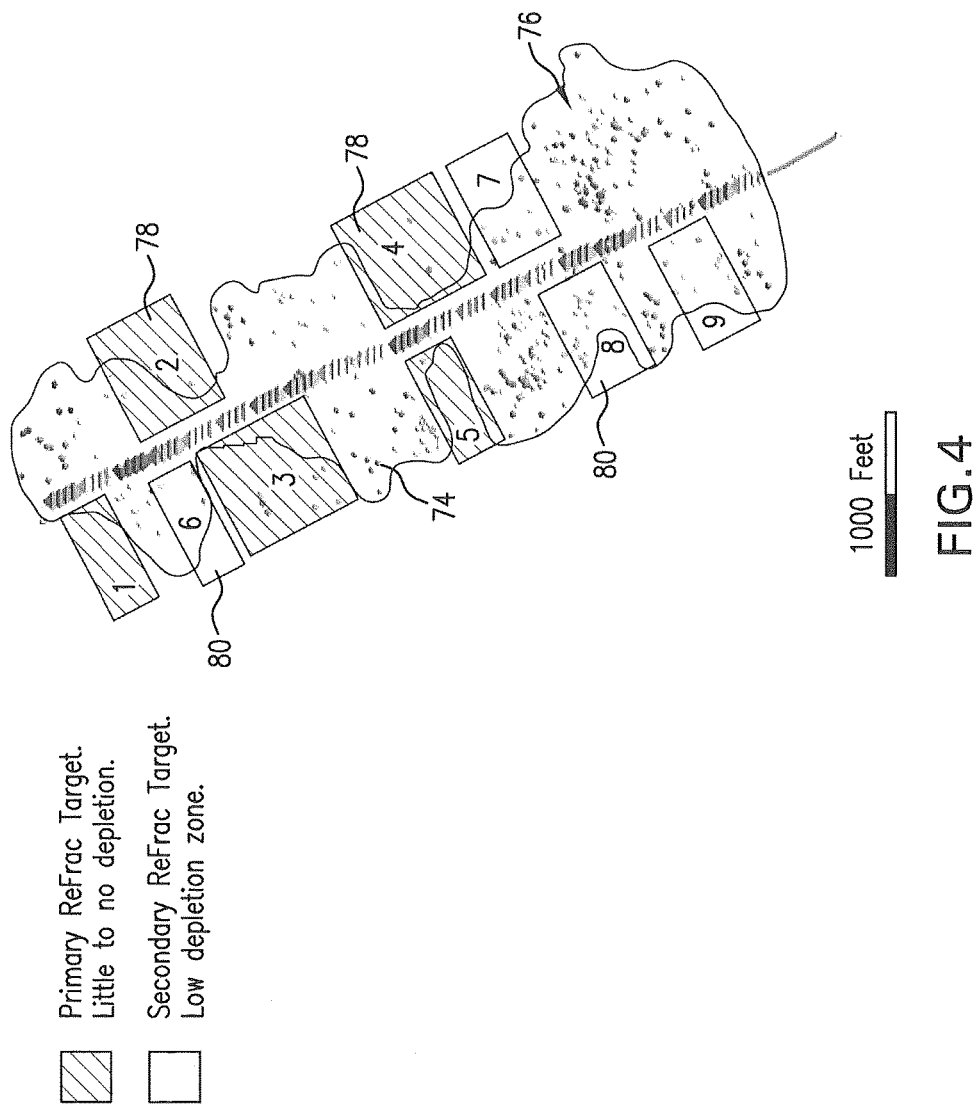
FIG. 4 depicts aspects of planning or designing a re-stimulation operation based on the microseismic data of FIG. 3.

An exemplary microseismic map 70 of a formation is shown in FIG. 3 and FIG. 4, which illustrates a display of the location of microseismic events around a borehole that were measured during a probe operation.

Depletion zones are identified as those areas that have a high depletion and low hydrocarbon content, i.e., those regions that were effectively stimulated and produced using the initial fracturing operations. Such depletion zones are identified based on the number of microseismic events in an area and/or the concentration of events. For example, depletion zones 76 having low microseismicity are identified as those regions in which the number or concentration of microseismic events is below a selected threshold, or those regions that have a high number or concentration relative to other regions in the map 70.

In addition, areas that have low depletion and high hydrocarbon content, i.e., those areas that were not sufficiently produced, are identified. Such areas are referred to as target zones, and may be targeted in a re-fracturing operation.

It is noted that, in this example, the bulk of fracturing during the initial operation occurred at more shallow zones, which is due to fluid pressure being initially higher at shallower levels, causing more fluid to be forced in the formation at higher zones and less fluid pressure at deeper zones.

In the fifth stage 65, a re-fracturing treatment is designed so as to target areas missed or under-utilized by the initial fracturing operation. For example, a re-fracturing operation is designed by identifying target zones and configuring operation parameters so that fluid injected during the re-fracturing operation is diverted to the target zones. The re-fracturing operation is subsequently performed by injecting stimulation fluid according to the design.

For example, the re-fracturing operation design is based on a map of microseismic events, such as the map 70. Regions of low seismicity relative to the depletion zones or a selected threshold are identified. In this example, two levels of target zones are identified. A number of primary target zones 78 are identified for those areas having the lowest microseismicity (little to no depletion), and a number of secondary target zones 80 are identified for those areas having higher depletion but still estimated to have significant hydrocarbon content. In this way, different target zones can be ranked or prioritized so that limited resources or time can be used most effectively.

In this example, the primary zones are located at depth ranges of about 14210-14050 feet (zone 1, west of the borehole), 12825-12340 feet (zone 2, east), 12462-12027 feet (zone 3, west), 11440-10500 feet (zone 4, east) and 11430-11080 feet (zone 5, west). These primary zones experienced the least microseismicity and consequently are considered to hold the highest amounts of hydrocarbons. The secondary zones experienced some microseismicity, but significantly less than the depletion zones, indicating that further stimulation has some production potential. The secondary zones in this example are identified at about 13000-12765 feet (zone 6, west), 10385-9975 feet (zone 7, east), 9900-9610 feet (zone 8, west) and 9190-8890 feet (zone 9, west).

In one embodiment, the re-fracturing operation is designed to direct injected fluid to target areas while avoiding injection of substantial amounts of fluid into depletion zones. This can be accomplished in numerous ways. For example, plugs and/or diverters (mechanical or chemical), are disposed to direct fluid to target zones.

In one embodiment, fluid flow control devices in the borehole string are deployed based on the locations or target zones and/or depletion zones. For example, packers or plugs may be deployed and activated at locations above and below a target zone to isolate a length of the borehole corresponding to the target region. Diverters, perforations and/or other fracturing devices are deployed in the isolated length so that fluid is injected into the target zone. In another example, liners are extended into the borehole and positioned so that they extend along lengths of the borehole corresponding to depletion zones. The liners are activated to isolate the depletion zones and prevent fluid from flowing therein during the re-fracturing operation.

The above configurations are exemplary; any suitable devices and techniques may be employed to target selected zones and ensure consistent fluid pressures along target zones identified by microseismic monitoring.

In one embodiment, the re-fracturing operation is monitored to evaluate the effectiveness of the re-fracturing operation and determine whether additional stimulation would be advantageous. For example, the formation is monitored during and/or after the re-fracturing operation to measure microseismic events. In addition, a subsequent probe and microseismic operation may be performed to evaluate the re-fracturing operation and identify any remaining target zones.

The systems and methods described herein provide various advantages over prior art techniques. Embodiments described herein provide an effective way to design and/or optimize production via re-fracturing to increase well productivity. An improved and/or optimized re-fracturing operation can be designed using microseismic monitoring, so that the operation can be used to effectively target those areas from which further production is feasible, and avoid unnecessary stimulation of areas or zones from which significant further production is not anticipated.

Generally, some of the teachings herein are reduced to an algorithm that is stored on machine-readable media. The algorithm is implemented by a computer or processor such as the control unit 34, and provides operators with desired output.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

The invention claimed is:

1. A method of stimulating an earth formation, comprising:
   disposing a stimulation device at a borehole in an earth formation, the earth formation having been stimulated by an initial stimulation operation, the initial stimulation operation being an initial hydraulic fracturing operation that includes injection of a stimulation fluid into the formation at a pressure at least equal to a fracturing pressure of the formation;
   subsequent to the stimulation operation, performing a probe operation configured to cause movement of existing fractures in the formation, wherein performing the probe operation includes injecting a treatment fluid into the formation at a pressure that is less than the fracturing pressure;
   measuring microseismic events occurring in the formation by one or more seismic receivers;
   identifying one or more target zones in the formation based on the measuring, the one or more target zones exhibiting a reduced microseismicity relative to another zone in the formation; and
   designing a re-stimulation operation configured to stimulate the one or more target zones to increase hydrocarbon production from the formation.

2. The method of claim 1, wherein:
   performing the probe operation includes injecting a treatment fluid at a pressure sufficient to pressurize the formation and cause one or more existing fractures in the formation to slip without causing new fractures to form, and subsequently allowing the one or more existing fractures to relax;
   measuring the microseismic events includes detecting seismic waves generated by at least the slip of the one or more existing fractures;
   identifying the one or more target zones includes identifying at least one depletion zone based on the measured microseismic events, the at least one depletion zone having a greater concentration of microseismic events than the one or more target zones; and
   designing the re-stimulation operation includes designing a stimulation device to inject stimulation fluid into the one or more target zones while preventing a substantial amount of treatment fluid from entering the at least one depletion zone.

3. The method of claim 1, wherein the existing fractures include natural fractures and any fractures created or activated by the initial stimulation operation.

4. The method of claim 1, wherein the stimulation fluid includes a proppant, and the treatment fluid does not include a proppant.

5. The method of claim 1, further comprising performing the re-stimulation operation by injecting stimulation fluid at a pressure that is at least equal to the fracturing pressure, and directing the stimulation fluid to the one or more target zones while substantially preventing the stimulation fluid from flowing into the another zone.

6. The method of claim 1, wherein measuring microseismic events includes detecting a plurality of seismic events occurring during and after the probe operation, and associating each seismic event with a location relative to the borehole.

7. The method of claim 6, wherein identifying the one or more target zones includes differentiating the one or more target zones from one or more depletion zones, the one or more depletion zones having a high concentration of microseismic events therein relative to the one or more target zones.

8. The method claim 7, further comprising performing the re-stimulation operation disposing a stimulation device in the borehole, activating the stimulation device to isolate the one or more depletion zones, and injecting stimulation fluid into the one or more target zones at a pressure that is at least equal to a fracturing pressure of the formation.

9. A system for stimulating an earth formation, comprising:
   a stimulation device configured to be disposed at a borehole in an earth formation, the earth formation having been stimulated by an initial stimulation operation, the initial stimulation operation being an initial hydraulic fracturing operation that includes injection of a stimulation fluid into the formation at a pressure at least equal to a fracturing pressure of the formation;
   a microseismic monitoring system including one or more seismic receivers; and
   a processor configured to perform:
   subsequent to the stimulation operation, performing a probe operation via the stimulation device to cause movement of existing fractures in the formation, wherein performing the probe operation includes injecting a treatment fluid into the formation at a pressure that is less than the fracturing pressure;
   measuring microseismic events occurring in the formation by the one or more seismic receivers;
   identifying one or more target zones in the formation based on the measuring, the one or more target zones exhibiting a reduced microseismicity relative to another zone in the formation; and
   designing a re-stimulation operation configured to stimulate the one or more target zones to increase hydrocarbon production from the formation.

10. The system of claim 9, wherein:
    performing the probe operation includes injecting a treatment fluid at a pressure sufficient to pressurize the formation and cause one or more existing fractures in the formation to slip without causing new fractures to form, and subsequently allowing the one or more existing fractures to relax;
    measuring the microseismic events includes detecting seismic waves generated by at least the slip of the one or more existing fractures;
    identifying the one or more target zones includes identifying at least one depletion zone based on the measured microseismic events, the at least one depletion zone having a greater concentration of microseismic events than the one or more target zones; and
    designing the re-stimulation operation includes designing a stimulation device to inject stimulation fluid into the one or more target zones while preventing a substantial amount of treatment fluid from entering the at least one depletion zone.

11. The system of claim 9, wherein the existing fractures include natural fractures and any fractures created or activated by the initial stimulation operation.

12. The system of claim 9, wherein the stimulation fluid includes a proppant, and the treatment fluid does not include a proppant.

13. The system of claim 9, wherein the processor is further configured to perform the re-stimulation operation by injecting stimulation fluid at a pressure that is at least equal to the fracturing pressure, and directing the stimulation fluid to the one or more target zones while substantially preventing the stimulation fluid from flowing into the another zone.

14. The system of claim 9, wherein measuring microseismic events includes detecting a plurality of seismic events occurring during and after the probe operation, and associating each seismic event with a location relative to the borehole.

15. The system of claim 14, wherein identifying the one or more target zones includes differentiating the one or more target zones from one or more depletion zones, the one or more depletion zones having a high concentration of microseismic events therein relative to the one or more target zones.

16. The system claim 15, wherein the processor is further configured to perform the re-stimulation operation by disposing a stimulation device in the borehole, activating the stimulation device to isolate the one or more depletion zones, and injecting stimulation fluid into the one or more target zones at a pressure that is at least equal to a fracturing pressure of the formation.

\* \* \* \* \*